United States Patent [19]
Järvenpää

[11] Patent Number: 5,759,408
[45] Date of Patent: Jun. 2, 1998

[54] METHOD AND EQUIPMENT FOR TREATMENT OF A LIQUID FLOW TO BE CLEANED AND PASSED INTO A FLOTATION PLANT OR EQUIVALENT

[75] Inventor: Viljo Järvenpää, Kerava, Finland

[73] Assignee: Wiser OY, Kerava, Finland

[21] Appl. No.: 722,047

[22] PCT Filed: Apr. 4, 1995

[86] PCT No.: PCT/FI95/00180

§ 371 Date: Nov. 27, 1996

§ 102(e) Date: Nov. 27, 1996

[87] PCT Pub. No.: WO95/26930

PCT Pub. Date: Oct. 12, 1995

[30] Foreign Application Priority Data

Apr. 5, 1994 [FI] Finland ................. 941544

[51] Int. Cl.$^6$ ................. C02F 1/24; B01F 3/04
[52] U.S. Cl. ................. 210/703; 210/221.2; 261/36.1; 261/93; 261/123
[58] Field of Search ................. 210/703, 221.2; 261/123, 93, 36.1

[56] References Cited

U.S. PATENT DOCUMENTS

| | | |
|---|---|---|
| 3,446,488 | 5/1969 | Mail . |
| 3,542,675 | 11/1970 | Mail . |
| 5,139,663 | 8/1992 | Maples . |
| 5,525,238 | 6/1996 | Menke . |

FOREIGN PATENT DOCUMENTS

| | | |
|---|---|---|
| 0259938 | 3/1988 | European Pat. Off. . |
| 90397 | 10/1993 | Finland . |
| 1137997 | 10/1962 | Germany . |

OTHER PUBLICATIONS

Ellis et al, "Clarifying Oilfield and Refinery Waste Water by Gas Flotation", Journal of Petroleum Technology (Apr. 1973), pp. 426–430.

B. Eppler, "Flotation als Modernes Verfahren in Industriellen und Kommvnalen Klaranlagen" 3R International, Apr. 1993, pp. 210–215.

G. Rohlich; "Application of Air Flotation to Refinery Waste Waters" Industrial and Engineering Chemistry, Feb. 1954, vol. 46, #2, pp. 304–308.

"Die Flotation–ein modernes Verfahren der Abwassraufbereitung", H. Richter, Chem–Ing–Tech., vol. 48, No. 1, Jan. 1976, pp. 21–26.

*Primary Examiner*—Thomas M. Lithgow
*Attorney, Agent, or Firm*—Steinberg, Raskin & Davidson, P.C.

[57] ABSTRACT

A method for treating a liquid flow to be cleaned passing through a flow line into a flotation plant including passing a portion of the liquid flow to be cleaned from the flow line along a first branch line into a pump. The suction capacity of the pump is regulated to draw in a direct flow of gas so that the pump sucks the gas as a direct flow. The drawn-in direct flow of gas is then mixed with the liquid flow in the pump and passed along a discharge pipe of the pump into a mixing part wherein the discharge pipe ends in a pressure release. The remaining portion of the liquid flow to be cleaned from the flow line is then passed along a second branch line into the mixing part. A liquid flow is discharged from the pressure release, the liquid flow including gas bubbles containing dissolved gas. The remaining portion of the liquid flow to be cleaned is then mixed with the liquid flow discharged from the pressure release to obtain a resultant flow which is then passed along a mixing duct into the flow line and further into the flotation plant.

18 Claims, 2 Drawing Sheets

METHOD AND EQUIPMENT FOR TREATMENT OF A LIQUID FLOW TO BE CLEANED AND PASSED INTO A FLOTATION PLANT OR EQUIVALENT

BACKGROUND OF THE INVENTION

The invention concerns a method for treatment of a liquid flow to be cleaned and passed into a flotation plant or equivalent.

Further, the invention concerns an equipment for treatment of a liquid flow to be cleaned and passed into a flotation plant or equivalent.

Flotation is a commonly known mode of removing solid materials from liquids. In particular a solid matter that is present as dispersed, which often contains static electric particles of solid matter, can be cleaned by means of flotation. In flotation, small gas bubbles are formed into the liquid to be cleaned. In studies carried out in this field, it has been ascertained commonly that a removal of particles larger than 10 μ can be achieved readily by means of flotation. However, it should be ascertained that absolute cleaning of water cannot be achieved by means of flotation. The size of the air or gas bubble is likely to have a substantial significance for how large/small particles can be removed. The composition of the gas dissolved in flotation and the pressure that is employed play an essential part, because the solubility of a gas into a liquid is directly proportional to the pressure. It is a substantial factor in dissolving of gas into liquid how to bring the liquid and the gas into contact with each other.

Currently, the commonest mode of dissolving air or gas into water/liquid is dissolution taking place in a pressure vessel. In the pressure vessel, the top portion is provided for the gas to be dissolved, and the liquid is placed in the bottom portion of the pressure vessel, the gas having been dissolved into said liquid or attempts being made to dissolve the gas into said liquid. As a rule, a separate pump circuit takes liquid from the bottom portion of the pressure vessel and sprays the liquid into the gas phase placed in the top portion of the pressure vessel, either through an ejector nozzle or by otherwise atomizing the liquid into the gas space. From the bottom portion of the pressure vessel, the liquid that contains dissolved gas is taken out, for example, through a suitable nozzle into the liquid to be treated. Thus, in this commonly known method, a pressure vessel, a pressurized feed of new liquid, and a feed of gas under pressure are needed. The cost of investment of such a solution is high, and it requires precise control, for example, to monitor the boundary between the liquid phase and the gas phase. It is a substantial drawback of this prior-art solution that when, for example, compressed air is used as the gas to be dissolved, for example, into water, it is the final result that the dissolved gas mainly consists of nitrogen, i.e., at an equilibrium, the proportion of oxygen in the gas phase is just about 8 % by weight, which is substantially less than in the free atmosphere, in which the proportion of oxygen is about 21 % by volume. This phenomenon comes from the fact that the solubility of oxygen in water is about twice as high as that of nitrogen. This is why, out of the gas present in the top portion of the pressure vessel, oxygen is dissolved first, and after refilling the oxygen is dissolved again, and finally the state of equilibrium of 8 %-wt. described above is reached. This is why a water that floats by means of pressure-vessel flotation is almost free from oxygen, i.e., in any case, non-oxidative. It is a consequence that this prior-art method has its drawbacks.

In order to solve the problem described above, a solution has been looked for by whose means a more oxidative flotation liquid could be obtained, i.e. a water rich in oxygen could be achieved. The activity of such a water towards chemical impurities is totally different from that of a water that contains inactive gas, such as nitrogen. It is only in cases in which it is desirable to exclude oxidation that dissolved oxygen is, of course, not favourable. Anyway, ionization and the activity of ions depend on the oxygen potential of the water/liquid. Thus, when a gas is dissolved into a liquid, it can be considered to be advantageous that, under pressurized and readily mixing conditions, a multiple solubility of oxygen is obtained directly from the air, compared with the prior-art pressure-vessel application. Moreover, if a gas mixture rich in gas or even an almost pure oxygen atmosphere is available, the solubility of oxygen can be increased substantially.

In conventional pressure flotation, for dissolving of gas, usually a pressure vessel and compressor air are used. The water, into which gas has been dissolved more or less to the saturation point, is passed in the so-called flotation basin to the inlet of the incoming water to be cleaned so that, at the inlet, these two liquid flows are combined and mixed. In such a case, the gas that is released from the pressure space forms gas bubbles characteristic of a release or dispersion nozzle, which bubbles then adhere to the solid impurities present in the water to be treated, i.e. in the contaminated water, and raise said impurities to the surface of the flotation basin, where the foam flocks are guided away or recovered in the desired way to a separate outlet. The smaller the bubbles are, the smaller are the solid particles carried along by them. On the other hand, the smaller the bubbles are, the more slowly do they rise to the surface, i.e. the rising of the solid particles carried along by the small bubbles to the surface is retarded, and therefore the flotation basin must be larger.

OBJECTS AND SUMMARY OF THE INVENTION

The object of the present invention is to provide an improvement over the prior art methods and equipments for treatment of a liquid flow to be cleaned and passed into a flotation plant or equivalent.

The method in accordance with the invention is characterized in that, in the method, (a) a part of the liquid flow to be cleaned that flows along the flow line, or cleaned liquid coming from the outlet of the flotation plant, is passed along a first branch line as a liquid flow into a pump, (b) the suction capacity of the pump is regulated so that the pump sucks gas as a flow, the gas that has been sucked into the pump being mixed with the liquid flow flowing in the first branch line, and further mixing of the gas and liquid take place in the discharge pipe of the pump, (c) the mixed flow of the gas and the liquid is passed along the discharge pipe of the pump into a mixing part, where the discharge pipe of the pump ends in a pressure release, (d) the rest of the liquid flow to be cleaned is passed along a second branch line as a liquid flow into the mixing part, where the liquid flow flowing along the second branch line is mixed with the liquid flow flowing in the discharge pipe of the pump, in which case, in the mixing part, out of the flow that is discharged from the pressure release, the gas bubbles in the liquid flow that contains dissolved gas are released, and (e) the liquid flow discharged from the mixing part is passed as a flow along a mixing duct into the flow line of the liquid flow to be cleaned and further as a flow into the flotation plant or equivalent.

The equipment in accordance with the invention is characterized in that the equipment comprises (a) a first branch line, along which a part of the liquid flow to be cleaned that flows along the flow line for the liquid flow to be cleaned, or cleaned liquid coming from the outlet of the flotation plant, is passed as a liquid flow into a pump, (b) a discharge pipe of the pump, the pump, whose suction capacity is adjustable, being fitted to suck gas as a flow, in which case the gas that has been sucked into the pump is mixed with the liquid flow that flows in the first branch line, and further mixing of the gas and the liquid takes place in the discharge duct of the pump, (c) a mixing part, which is fitted to receive the mixed flow of gas and liquid along the discharge pipe of the pump and the rest of the liquid flow to be cleaned along the second branch line as a liquid flow, the liquid flow that flows along the second branch line being fitted to be mixed in said mixing part with the liquid flow that flows in the discharge pipe of the pump, (d) a pressure release, in which the discharge pipe of the pump is fitted to terminate, the release of the gas bubbles from the liquid flow that contains dissolved gas being fitted to take place from the flow discharged out of the pressure release in the mixing part, and (e) a mixing duct, along which the liquid flow discharged from said mixing part is fitted to flow as a flow into the flow line of the liquid flow to be cleaned and further as a flow into the flotation plant or equivalent.

According to the basic realization of the invention, it has been successfully possible to develop a solution model or assembly of equipment of a novel mode of operation so that, out of the pipe connection passing directly into the flotation treatment, at a distance suitable for the flotation process from the flotation basin itself, a connecting duct has been fitted, in which either the liquid to be treated or cleaned liquid taken from the outlet of the flotation plant flows, a pump that sucks gas, for example air, mixing the gas and the liquid and pressurizing the sucked components, whereby the gas is dissolved in the liquid. Such a gas-liquid mixture is passed along the discharge pipe of the pump into a mixing part, where a dispersing nozzle disperses the gas-liquid mixture as completely as possible. Into the mixing part, liquid to be treated is also passed along the second connecting duct, in which case, in the mixing part, both the pressurized liquid into which gas has been dissolved and the liquid that is being passed into the flotation treatment are mixed well and thereupon flow together along the mixing duct into the pipe duct for the liquid to be treated, and after that into the flotation plant or equivalent. Then, gas is released all the time in the mixing part and in the subsequent extension duct into micro-bubbles, which are mixed as thoroughly as possible with the liquid passing into the flotation treatment and adhere to the particles of solid matter present in said liquid.

In a preferred embodiment of the invention, liquid that is passing to the treatment, i.e. liquid that contains particles of solid matter, are taken to the dissolution of gas, in which case blocking of the dispersing nozzle is prevented by, at regular intervals, releasing the back pressure that regulates the pressure of the pump. In the mixing part of the equipment in accordance with the invention, it is possible to use the regulation pressure used for regulation of the size of the pressure-controlled membrane-pressed gap by releasing the regulation pressure, in which case the particles of solid matter that block the pressure-discharge gap can be detached from the orifice of the discharge pipe of the pump and be passed to the further flow along with the rest of the liquid flow and further into the flotation basin.

BRIEF DESCRIPTION OF THE DRAWINGS

The invention will be described in detail with reference to a preferred embodiment of the invention illustrated in the figures in the accompanying drawings, the invention being, yet, not supposed to be confined to said embodiment alone.

DETAILED DESCRIPTION OF THE INVENTION

Figure 1:
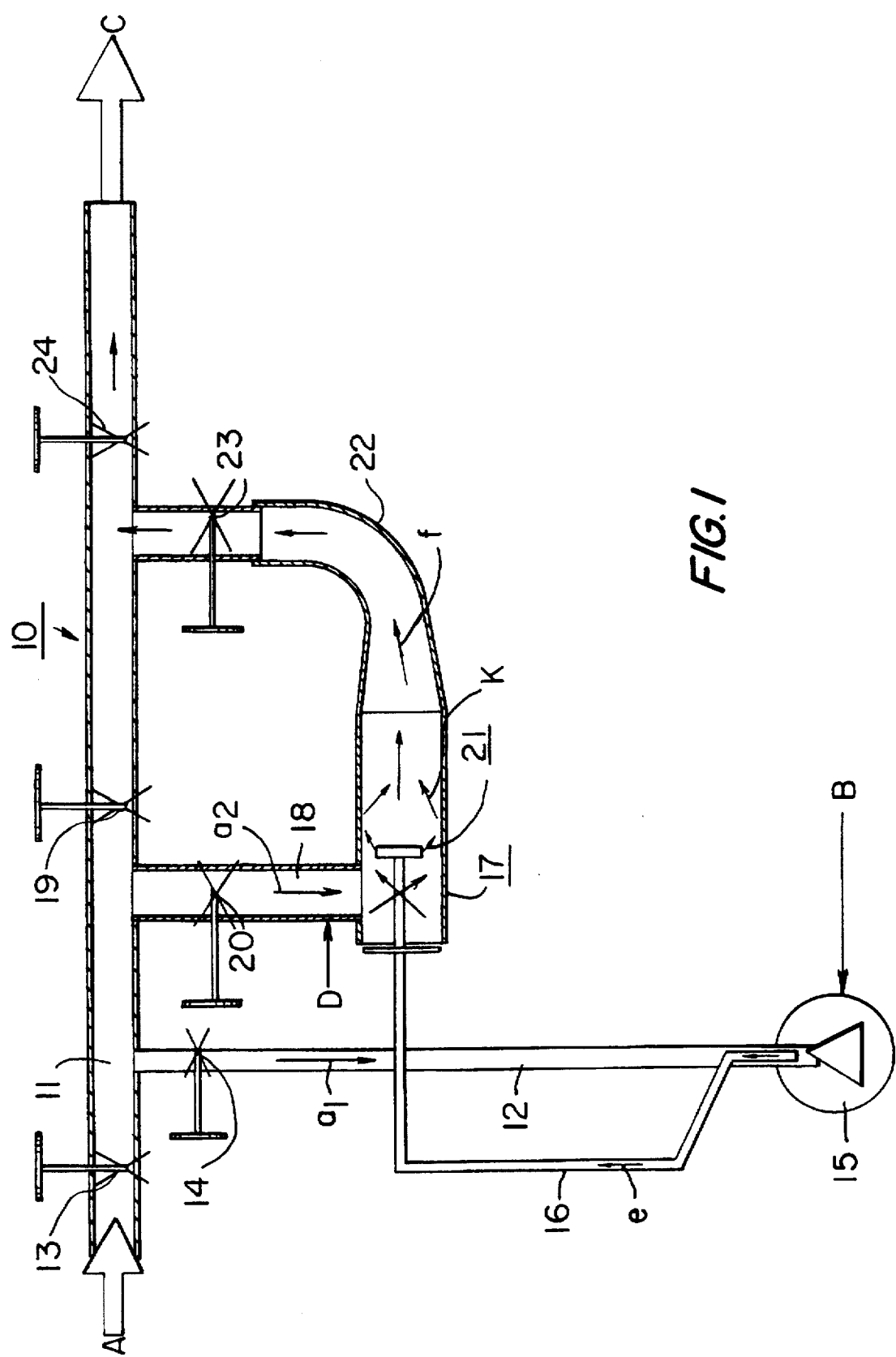
FIG. 1 is a schematic side view of the method and the equipment in accordance with the invention.
Figure 2:
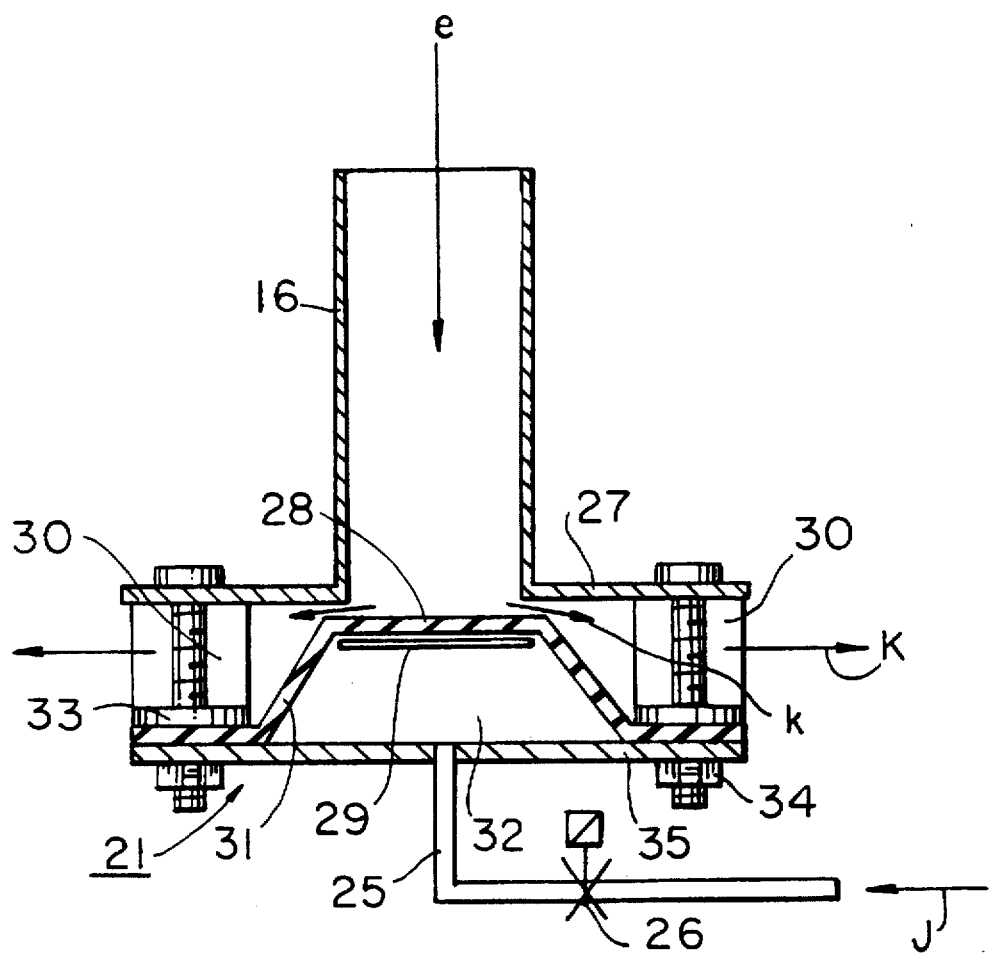
FIG. 2 shows a detail of a pressure release in accordance with the invention on an enlarged scale.

In the embodiment as shown in FIGS. 1 and 2, the equipment in accordance with the invention is denoted generally with the reference numeral 10. The liquid to be cleaned flows as a flow A along the pipe line 11. The liquid flow A to be cleaned, which has been treated in the way in accordance with the invention, is discharged from the pipe line 11 as a flow C into a flotation plant or equivalent. In this embodiment, from the flow line 11, a first side branch or pipe connection 12 has been passed, which passes to the pump 15. In the pipe line 12 a regulation valve 14 is placed, which regulates the throttle in the flow duct 12 and so also the suction capacity of the pump 15 with regard to the gas flow B. The component flow of the inlet flow A of the liquid to be treated in the pipe line 12 is denoted with the reference $a_1$. Thus, the pipe connection 12 operates as a suction duct for the pump 15. After the pump 15 there is the discharge pipe 16. Into the pump 15, gas, such as air, is sucked as a flow B if the regulation valve 14 is throttled to a level below the suction capacity of the pump 15. The air or gas B that has been sucked into the pump 15 in this way is mixed with the liquid flow $a_1$ flowing in the pipe duct 12, and in the discharge duct 16 of the pump 15 the air/gas and the liquid are mixed further after the so-called runner-wheel mixing produced by the pump 15. Such a mixed flow in the discharge pipe 16 is denoted with the letter e.

The discharge pipe 16 passes into a mixing part, which is denoted generally with the reference numeral 17. In the mixing part 17, the discharge pipe 16 terminates in a dispersing nozzle, i.e. a pressure release, which is denoted generally with the reference numeral 21 and which regulates the pressure of the pump 15 by means of an adjustable back pressure, e.g., by means of the construction shown in FIG. 2.

Into the mixing part 17, from the flow duct 11, a second side branch 18 passes, along which, in this embodiment, the rest of the feed-in flow A flows. From the mixing part 17, the mixing duct 22 continues, which joins the flow duct 11. The flow that is discharged from the mixing part 17 is denoted with the letter K. The flow that flows in the mixing duct 22 is denoted with the letter f. The flow K, and later the flow f, form the flow C passing into the flotation basin. The flow C contains the micro-bubbles in the liquid flow K that has flown out of the pressure release 21 and that contains dissolved air/gas B, which bubbles are produced in the flow K upon discharge of the pressure from the pressure release 21 and which bubbles are included in the subsequent flow f.

As is shown in FIG. 2, the flow e flowing in the discharge pipe 16 flows into the pressure release 21, in which the discharge pipe 16 terminates in the flange 27. On the orifice of the discharge pipe 16, there is a resilient membrane 31, in whose middle there is a seal part 28 that is made of the same material or of a different material. The support construction of the seal part 28 is denoted with the reference numeral 29. The diameter of the seal part 28 is preferably larger than the diameter of the discharge pipe 16. The seal part 28 of the resilient membrane 31 forms a flow gap with the orifice of the discharge pipe 16, along which gap the flow e flowing in the discharge pipe 16 is directed as the flow k. Below the flange 27, there are guide plates 30 for guiding the flow k. The guide plates 30 are placed between the flange 27 and the annular flange 33. The seal part 28 of the resilient membrane 31 regulates or, if necessary, closes the flow e that is discharged out of the discharge pipe 16 to make the flow k, which is again discharged out of the pressure release 21, after the guide plates 30, as the flow K.

The closing valves placed in the flow line 11 are denoted with the reference numerals 13,19 and 24. The closing valve placed in the flow duct 18 is denoted with the reference numeral 20. The closing valve placed in the mixing duct 22 is denoted with the reference numeral 23.

Underneath the resilient membrane or plate 31 in the pressure release 21, there is a closing plate 35, through which a pressure supply pipe 25 passes. The supply of pressurized gas J is passed along the pipe 25 into the pressure space 32. The regulation valve placed in the pressure supply pipe 25 is denoted with the reference numeral 26. The reference numeral 34 denotes the tightening member, which may be, for example, a bolt, by whose means the guide plates 30 are pressed between the flange 27 and the annular flange 33.

The magnitude of the pressure present in the pressure space 32 determines how close the seal part 28 of the resilient membrane 31 is to the orifice of the discharge pipe 16, and by means of the adjustable pressure it is possible to regulate the magnitude of the flow gap. It should be noticed that the seal part 28 of the resilient membrane 31 is pressed against the orifice of the discharge pipe 16 to the desired distance from the orifice, i.e. thus regulating the pressure of the pump 15 to the desired level, whereby the flow k corresponds to the pressure of the pump 15.

In ordinary cases, the flow duct 11 is fully the same as the side branch, i.e. the flow duct 18, i.e. in a case in which there is no flow duct 11. If it is desirable to add a pipe flotation solution in accordance with the present invention to an existing flow duct 11 afterwards, this should be preferably carried out exactly by means of the solution shown in FIG. 1. In such a case, it is, of course, necessary to make, e.g., T-joints and to use regulation and closing valves 13,14,19, 20,23 and 24, by whose means the flow can be passed either directly along the flow duct 11 through the valves 13,19 and 24 when the valves 14,20 and 23 are closed, or through the pipe flotation devices that produce micro-bubbles into the flotation basin, in which case the valve 19 is closed and the valves 13,14,20,23 and 24 are open.

To the flow that contains micro-bubbles, it is possible to add, for example, a flocculant at the desired point as the flow D. This may take place preferably before the mixing part 17, for example, in the side branch 18, as is shown in FIG. 1. If there is no feed-in flow duct 11, i.e. it is the same as the duct 18, the intake into the pipe duct 12 is, in such a case, of course, from the duct 18 before the valve 20.

The greatest importance of the invention is therein that, by means of the solution in accordance with the invention, the micro-bubbles in the flow K after the pressure release 21 can be mixed with the flow C as well as possible before the flotation basin. In such a case, the micro-bubbles find their way very well to the particles of solid matter to be removed, present in the feed-in flow A, or to the flocks that may be produced by a flocculant in the liquid flow. It is a significant advantage of the invention that, in the method and equipment in accordance with the invention, it is also possible to use an impure feed flow A directly for dissolution of gas in the pump 15 and, by regulating the vacuum in the pump 15, the gas flow B can be produced and mixed with such an impure liquid. In the equipment in accordance with the invention, the pressure release 21 allows impurities in the pressurized flow e in the discharge pipe 16, because, by means of the regulation valve 26, the pressure in the pressure space 32 can be released at desired intervals, in which case the seal part 28 is pulled away from the orifice of the discharge pipe 16. In such a case, any solid matter that may have gathered at the orifice of the discharge pipe 16 can be discharged and flow further into the flow C passing to the flotation plant.

The rest of the feed-in flow A passing from the side branch 18 into the mixing part 17 is passed to the mixing part 17 preferably tangentially. From the point of view of the invention, it is also preferable that the feed-in flow A is pressurized.

By means of the solution of the present invention, pressure flotation can be carried into effect in a simple way as a solution of very low investment cost. The size of the equipment 10 in accordance with the invention is also little. Passing the flow C into the flotation basin becomes very simple, and by means of the flow C the circulation of the liquid in the flotation basin can be arranged as desired, and thereby the removal of the foam that rises to the surface together with the solid matter can be chosen appropriately. The flow C can be subjected to the desired pressure, which pressure should, however, preferably be lower than the pressure produced by the pump 15, which pressure is released in the pressure release 21.

In view of the operation of the invention, it is obvious that the flow in the suction pipe 12 may also come from the clean side of the flotation basin, but such an alternative embodiment produces an unnecessary cost, because, for dissolving the gas in the pump 15, it is equally well possible to use the impure feed-in flow A, as is indicated in FIGS. 1 and 2 in the drawings.

In view of the invention, the distance and the feed-in of the flow C into the flotation basin are by no means critical. Also, the formation of the feed-in flow A and passing a part of same into the pump 15 as the flow $a_1$ and passing the rest of it as the flow $a_2$ into the mixing part 17 can be carried out in a number of different ways.

Above, just a preferred embodiment of the invention has been described, and it is obvious to a person skilled in the art that numerous modifications can be made to said embodiment within the scope of the inventive idea defined in the accompanying patent claims.

I claim:

1. A method for treating a liquid flow to be cleaned passing through a flow line into a flotation plant, comprising
    passing a portion of the liquid flow to be cleaned from the flow line along a first branch line into a pump,
    regulating the suction capacity of the pump to draw in a direct flow of gas so that the pump sucks the gas as a direct flow,
    mixing the drawn-in direct flow of gas with the liquid flow in the pump, passing the mixed flow of gas and liquid along a discharge pipe of the pump into a mixing part wherein the discharge pipe ends in a pressure release, passing a remaining portion of the liquid flow to be cleaned from the flow line along a second branch line into the mixing part, discharging a liquid flow from the pressure release, the liquid flow including gas bubbles containing dissolved gas, mixing the remaining portion of the liquid flow to be cleaned with the liquid flow discharged from the pressure release to obtain a resultant flow, and passing the resultant flow along a mixing duct into the flow line and further into the flotation plant.

2. The method of claim 1, wherein the step of regulating the suction capacity of the pump comprises the step of regulating a throttle of an intake duct of the pump by means of a regulation valve.

3. The method of claim 1, wherein the step of regulating the suction capacity of the pump comprises the step of regulating the pressure of the pump by means of an adjustable back pressure of the pressure release.

4. The method of claim 3, wherein said discharge pipe has a discharge orifice and the method further comprises the step of adjusting the back pressure by regulating the distance of a resilient membrane placed in opposed relationship to the orifice of the discharge pipe from the orifice of the discharge pipe.

5. The method of claim 4, further comprising the steps of passing the liquid flow that flows along the discharge pipe of the pump through a flow gap formed by the orifice of the discharge pipe and the resilient membrane as a first flow via guide plates, and discharging the first flow after the guide plates out of the pressure release as a second flow.

6. The method of claim 5, further comprising the step of passing a supply of pressurized gas along a flow line provided with a regulation valve into a pressure space arranged below the resilient membrane.

7. The method of claim 1, wherein the second branch line is a flow duct for a feed-in liquid flow.

8. The method of claim 1, further comprising the step of adding a flocculent as a flow to the liquid flow to be cleaned in the second branch line before the mixing part.

9. The method of claim 1, wherein the step of passing the remaining portion of the liquid flow to be cleaned into the mixing part comprises the step of passing the remaining portion of the liquid flow to be cleaned into the mixing part in a direction tangential to an inner peripheral surface of the mixing part.

10. An apparatus for treating a liquid flow to be cleaned passing through a flow line into a flotation plant, comprising a first branch line in flow communication with the flow line and along which a portion of the liquid flow to be cleaned is passed, pumping means for drawing in a direct flow of gas and mixing the drawn-in gas flow with the portion of the liquid flow to be cleaned in said first branch line, said pumping means including adjusting means for adjusting the suction capacity of said pumping means, a discharge pipe coupled to said pumping means at a first end and having an orifice situated at a second end opposite to said first end, the mixed flow of gas and liquid being passed through said discharge pipe, a mixing part arranged to receive the mixed flow of gas and liquid from said discharge pipe through the orifice formed in the second end of said discharge pipe, a second branch line along which the rest of the liquid flow to be cleaned flows to be mixed in said mixing part with the mixed flow of gas and liquid that flows in said discharge pipe, a pressure release arranged at the second end of said discharge pipe to facilitate the release of gas bubbles from the mixed flow of gas and liquid, and a mixing duct along which the liquid flow discharged from said mixing part flows into the flow line and further into the flotation plant.

11. The apparatus of claim 10, wherein said pumping means comprise an intake duct, further comprising a regulation valve arranged in said first branch line for regulating the throttle of the intake duct of said pumping means.

12. The apparatus of claim 10, wherein said pressure release includes a pressure space for regulating the pressure of said pumping means.

13. The apparatus of claim 10, wherein said pressure release includes a resilient membrane arranged in opposed relationship to the orifice of said discharge pipe, the distance between said resilient membrane and the orifice of said discharge pipe being adjustable.

14. The apparatus of claim 10, wherein said pressure release includes guide plates, the mixed flow of gas and liquid that flows through said discharge pipe being directed through a flow gap formed by the orifice of said discharge pipe and said resilient membrane via said guide plates and out of said pressure release.

15. The apparatus of claim 14, wherein said pressure release includes a flow line, along which a supply of pressurized gas is passed into a pressure space arranged below said resilient membrane, further comprising a regulation valve arranged in said flow line of said pressure release.

16. The apparatus of claim 10, wherein said second branch line is a flow duct for the liquid flow to be cleaned.

17. The apparatus of claim 10, further comprising means for enabling the addition of a flocculent into the liquid flow before said mixing part.

18. The apparatus of claim 10, wherein said pumping means is a pump.

\* \* \* \* \*